United States Patent
Beeler et al.

(10) Patent No.: US 9,710,965 B2
(45) Date of Patent: Jul. 18, 2017

(54) CAPTURING AND STYLIZING HAIR FOR 3D FABRICATION

(71) Applicants: Thabo Beeler, Zurich (CH); Derek Bradley, Zurich (CH); Jose Ignacio Echevarria, Saragossa (ES)

(72) Inventors: Thabo Beeler, Zurich (CH); Derek Bradley, Zurich (CH); Jose Ignacio Echevarria, Saragossa (ES)

(73) Assignee: Disney Enterprises, Inc., Burbank, CA (US)

( * ) Notice: Subject to any disclaimer, the term of this patent is extended or adjusted under 35 U.S.C. 154(b) by 241 days.

(21) Appl. No.: 14/483,122

(22) Filed: Sep. 10, 2014

(65) Prior Publication Data

US 2016/0071316 A1 Mar. 10, 2016

(51) Int. Cl.
- G06T 15/00 (2011.01)
- G06T 17/20 (2006.01)
- G06T 19/20 (2011.01)
- G06T 15/20 (2011.01)

(52) U.S. Cl.
CPC ............ G06T 17/20 (2013.01); G06T 15/205 (2013.01); G06T 19/20 (2013.01); G06T 2219/2024 (2013.01)

(58) Field of Classification Search
None
See application file for complete search history.

(56) References Cited

U.S. PATENT DOCUMENTS

| | | | |
|---|---|---|---|
| 6,271,856 B1 * | 8/2001 | Krishnamurthy | 345/581 |
| 8,249,365 B1 * | 8/2012 | Winnemoeller | G06T 11/001 382/181 |
| 2007/0159486 A1 * | 7/2007 | Sasaki | G06T 13/40 345/473 |
| 2013/0226528 A1 * | 8/2013 | Hodgins | G06T 17/00 703/1 |
| 2014/0160123 A1 * | 6/2014 | Yang | G06T 17/00 345/420 |
| 2014/0267225 A1 * | 9/2014 | Zhang | G06T 7/0067 345/419 |

* cited by examiner

*Primary Examiner* — Andrew G Yang
(74) *Attorney, Agent, or Firm* — Patent Ingenuity, P.C.; Samuel K. Simpson (57) ABSTRACT

A process, computer program product, and apparatus provide color and shape stylization for a captured hairstyle. The process, computer program product, and apparatus receive a plurality of images of a hairstyle in an n dimensional space at a plurality of different angles. Further, the process, computer program product, and apparatus generate a mesh surface in an n−1 dimensional space. In addition, the process, computer program product, and apparatus combine color data from the plurality of images at the plurality of different angles with mesh geometry data of the mesh surface. The process, computer program product, and apparatus also stylize the color data with an n dimensional filter that projects the color data to the n−1 dimensional space of the mesh surface. The process, computer program product, and apparatus may also stylize the geometric shape details in a coherent manner with the color.

22 Claims, 9 Drawing Sheets
(5 of 9 Drawing Sheet(s) Filed in Color)

CAPTURING AND STYLIZING HAIR FOR 3D FABRICATION

BACKGROUND

1. Field

This disclosure generally relates to the field of computer graphics. More particularly, the disclosure relates to computer graphics systems for capturing and stylizing hair for 3D fabrication.

2. General Background

A common goal in the field of computer graphics is to generate data-driven methods, i.e., programmatic paradigms with program statements that describe data that is matched rather than code that is processed in sequence, for building geometric models of humans. Recent advances have led to the development of configurations for 3D face and body scanning, motion capture, and real time performance capture. Such configurations are typically used to produce computer generated characters used in fields such as video games, films, and medical analysis.

Some current computer graphics systems also support the fabrication of physical goods such as personalized figurines, i.e., miniaturized statues of a person, object, etc. These personalized figurines are typically generated by scanning real people, objects, etc., creating a 3D computer model from the scan, and then utilizing a 3D printer to reproduce the physical goods from the 3D model. Physical goods of surprising realism can be created with sufficient resolution and fidelity in the scanning process, however, detailed features such as hair remain difficult to accurately capture and reproduce.

Although a person's hair is a defining and recognizable characteristic, it is to capture and reproduce a product such as a personalized figurine. The current systems are limited in that they do not suitably capture personalized hairstyles for physical reproduction of a personalized figurine. Since a person's hairstyle may contribute so substantially to the recognizability of that person, i.e., almost as much as a person's face contributes to that person's recognizability, the reproduction quality of a personalized figurine with current systems is limited.

Therefore, a configuration that automatically reduces the complexity of hair to an abstract and printable 3D surface while capturing the essential structural and color elements that define the hairstyle is needed. A configuration is also needed that may be used in conjunction with existing facial scanning technology to generate a personalized figurine, virtual character, etc. based on facial features and hairstyle features.

SUMMARY

A process, computer program product, and apparatus provide color and shape stylization for a captured hairstyle. The process, computer program product, and apparatus receive one or more images of a hairstyle in an n dimensional space at one or more different angles. Further, the process, computer program product, and apparatus generate a mesh surface in an n−1 dimensional space. For example, a three dimensional hair-style is captured from a plurality of viewpoints in two dimensional images. The corresponding mesh surface is a two dimensional manifold embedded in three dimensional space. As another example, by including time, these dimensions would be increased by one dimension. In addition, the process, computer program product, and apparatus combine color data from the plurality of images at the plurality of different angles with mesh geometry data of the mesh surface. The process, computer program product, and apparatus also reduce a complexity of a hairstyle by stylizing the color data with an n dimensional filter that projects the color data to the n−1 dimensional space of the mesh surface. The process, computer program product, and apparatus may also stylize the geometric shape details in a coherent manner with the color. This geometric stylization may be controlled by the user by providing shape functions that prescribe the local shape of the hair.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned features of the present disclosure will become more apparent with reference to the following description taken in conjunction with the accompanying drawings wherein like reference numerals denote like elements and in which.

DETAILED DESCRIPTION

A stylized hair capture system is provided to capture a hairstyle of a person, object, animal, etc. for creating a virtual or physical representation such as miniaturization and physical reproduction in a personalized figurine, virtual character, etc. The stylized hair capture system can be used with various configurations such as 3D printing systems, motion capture systems, virtual reality systems, etc. A 3D hair surface is computed so that the 3D hair surface has geometry and color information that resembles a hairstyle, but is abstracted in a manner that is suitable for producing low resolution renditions such as those fabricated with 3D printing.

The stylized hair capture system uses a multi-view stylization approach that extends feature preserving color filtering from 2D images to irregular manifolds, i.e., topological spaces, in 3D. In contrast with previous configurations, the stylized hair capture system obtains different levels of abstraction that retain a portion or all of the features of the hairstyle through different scales that are each capable of being printed in 3D. Further, abstract geometric details that are coherent with color stylization are used. The stylized hair capture system allows the personalized figurines to have stylized subject specific details that are recognizable as the identity of the individual, object, animal, etc.

The stylized hair capture system obtains a surface representation of a hairstyle from a multi-view stereo reconstruction. Alternatively, the stylized hair capture system may obtain the surface representation from a variety of other configurations, e.g., photometric stereo reconstruction, visual hulls, time-of-flight, structure-from-motion capture, etc. A color stylization operator can be applied directly on the geometric mesh domain and over non-uniform manifold surfaces. Accordingly, color information is sampled, stored, and processed on the mesh surface in a coherent manner, i.e., a manner consistent with the images captured from the different input views such as local orientations of the hair in one or more images. The color is stylized over the mesh surface by utilizing a combination of directional smoothing and orthogonal shock filters to retain the appearance of directional wisps and the overall flow of hair. The stylized color is then used to generate coherent geometric displacements over the surface per vertex to effectively stylize the shape. As a result, the surface is printable by a 3D printer into a miniaturized figurine so that both the geometry and color convey the hairstyle of the person, object, animal, etc. In one implementation, the user may adjust the level of abstraction and/or the local shape of the geometric details to match the scale of the final printout and achieve different visual styles that behave in a consistent manner irrespective of the complexity of the original hairstyle. In another implementation, the stylized hair is combined with facial scanning technology and 3D printing technology to fabricate full head figurines.

Figure 1:
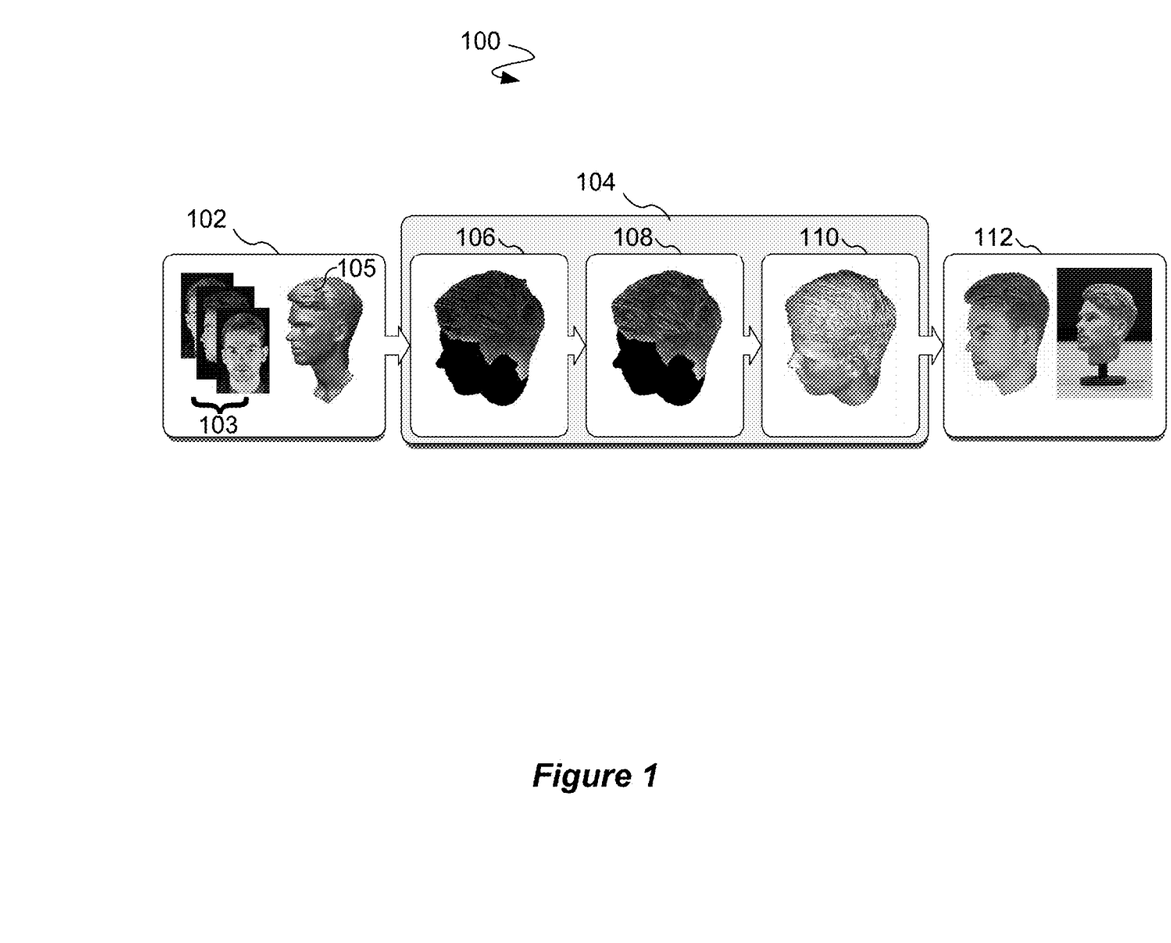
FIG. 1 illustrates an exemplary stylized hair capture process used.

FIG. 1 illustrates a stylized hair capture process 100. At 102, the stylized hair capture process 100 performs a surface reconstruction with data that is acquired from data acquisition. For example, data acquisition may be performed to acquire a plurality of input images 103 of a person from multiple angles. A mesh surface 105 of the hair, i.e., a 3D reconstruction of the hair surface comprising a plurality of vertices, is generated from the plurality of input images 103. The mesh surface 105 may have a coarse or a fine resolution.

At 104, the mesh surface 105 is then used to perform a stylized hair capture subprocess. The stylized hair capture subprocess 104 initializes color information at 106. In other words, the mesh surface 105 is used to sample color information from the different views in a coherent manner. The color for each vertex of the mesh geometry is combined with color information from the plurality of input images 103. Color information is converted from red-green-blue color space ("RGB") to hue-saturation-value color space ("HSV") and then separated into different frequency bands, e.g., at least low and high frequency bands, for each input view. In one implementation, the frequencies are separated such that the high frequency band contains predominately the spatial frequencies caused by individual hairs and wisps, and the low frequency band contains the rest. By using HSV, the intensities of the various color information is exposed explicitly and may be adjusted directly. Adjusting the intensities allows equalization, improvement, and boosting of the local contrast, which plays a central role in color stylization. As a result, geometric and color information may be processed analogously, i.e., in a corresponding manner, since both intensities and geometric offsets are a single scalar value per vertex and are directly related, i.e., a larger offset may be related to higher intensity or vice-versa, depending on the direction of the offset. Low frequency color information is sampled from each view and averaged for each vertex on the mesh surface 105. The high frequency color information is then sampled over the most optimal view, i.e. the view with the least foreshortening with respect to the surface and least occlusion, by each vertex in a coherent manner to avoid artifacts and loss of details. The low frequency color information and the high frequency color information are then stored on the mesh surface 105.

Further, the stylized hair capture subprocess uses a 3D stylization filter to stylize color information over the mesh surface 105 at 108. The 3D stylization filter is used to abstract the high frequency color details. The 3D stylization filter is computed from directional smoothing and shock operations based on a structure tensor determined from the different views. The stylization filter allows the artist rendering the 3D printable surface to control the level of color abstraction used for that 3D printable surface, by using smoothing and shock filters of varying sizes. Larger filter sizes will lead to more abstraction, while small filters will lead to more retention of details.

The stylized hair capture subprocess then extracts detailed structure from the stylized colors to stylize the geometry of the hair at 110. In other words, the computed stylized color information may be used to stylize the geometry in a similar manner. The artist rendering the 3D printable surface has control over the geometric details of the mesh surface 105. By separating the details into different frequency bands and using HSV space, offsets are naturally translated into geometric displacements to be applied over the low frequency. The geometric refinements may then be further processed by applying user controllable profiles to achieve different effects. Potential effects are round wisps of different spatial frequencies, e.g., sinusoidal profiles, triangular wisps, rectangular wisps, etc. All frequencies of both color and geometry are then added together to form the stylized hair. Alternatively, more than two frequency bands of varying frequencies may be used.

The stylized hair capture subprocess 104 then outputs a stylized hair capture 3D printable surface at 112. The 3D printable surface is based upon a stylized mesh that abstracts the complexity of a real hairstyle while still capturing the defining features of the hairstyle. As the artist is provided with the ability to select different levels of abstraction, the artist is able to retain the most important features of the hairstyle at a given scale, e.g. individual hairs at large scales, strains at medium scales and wisps at small scales, which is important for 3D printing, e.g., different sized figurines are 3D printed with the according hairstyle features. The artist is provided with the ability to sculpt the hairstyle of a 3D printed figurine with different adjustable levels abstraction determined by the artist that maintain the defining features of the hairstyle while allowing for artistic flexibility.

Figure 2:
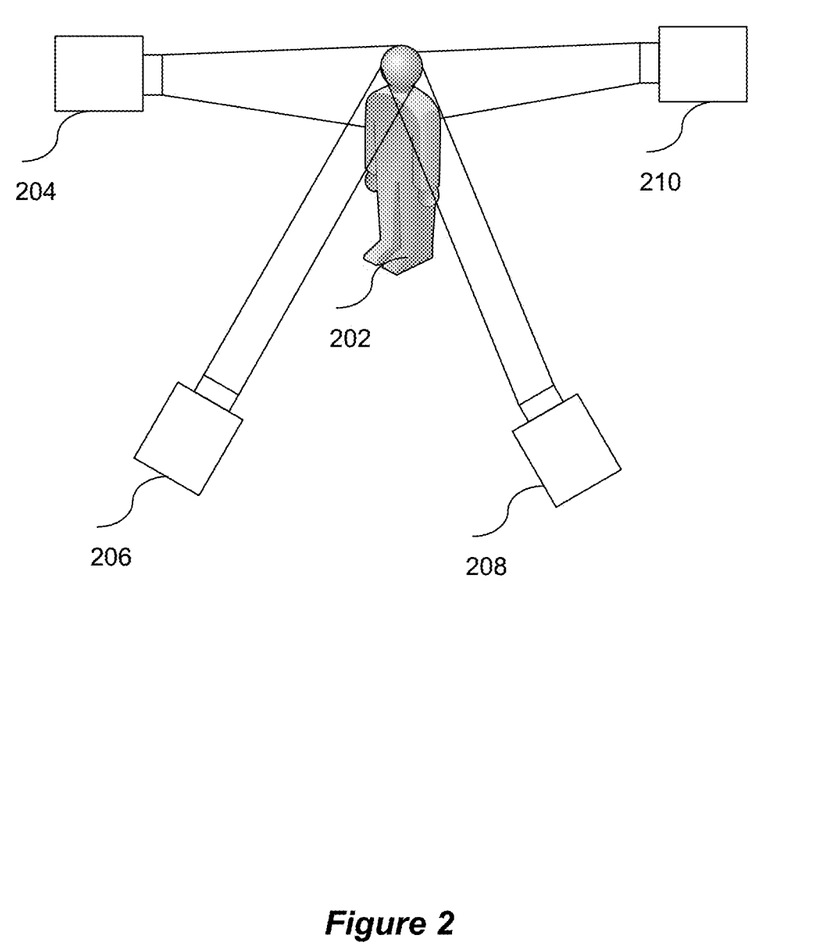
FIG. 2 illustrates a multi-view stylized hair capture configuration.

FIG. 2 illustrates a multi-view stylized hair capture configuration 200. The multi-view stylized hair configuration 200 captures the plurality of images 103 of a person 202, object or animal illustrated in FIG. 1 from different angles with a plurality of different image captures devices 204, 206, 208, and 210, e.g., cameras. Although four image capture devices 204, 206, 208, and 210 are illustrated, any quantity of image capture devices may be used such that enough images are captured to generate a full mesh surface 105 as illustrated in FIG. 1. In another implementation, a single camera is used. The subject is spun in front of the single camera at different orientations to capture the plurality of images 103. In yet another implementation, mirrors are used. A single camera or multiple cameras capture images from the reflections.

Figure 3:
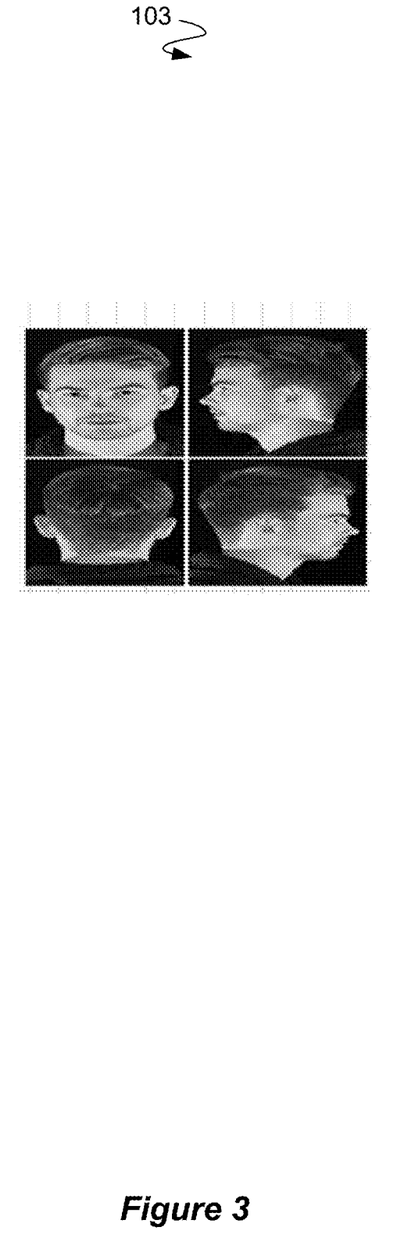
FIG. 3 illustrates an example of the plurality of images illustrated in FIG. 1 captured from four different orientations defined by ninety degree rotations.

For example, FIG. 3 illustrates an example of the plurality of images 103 illustrated in FIG. 1 captured from four different orientations, e.g., angles, taken at ninety degree angles. The four different angles capture enough information to generate the full mesh surface 105 as illustrated in FIG. 1. Each angle may consist of a particular quantity of viewpoints. For instance, scans may be performed from the four different orientations with each orientation consisting of ten viewpoints. The quantity of orientations depends on the quantity of viewpoints employed. Accordingly, a single orientation may be enough for a particular quantity of viewpoints whereas more than one orientation may be implemented if a lesser quantity of viewpoints is used. The orientations illustrated in FIG. 3 are provided only for ease of illustration as a variety of orientations may be implemented based upon the quantity of viewpoints corresponding to the orientations.

Figure 4:
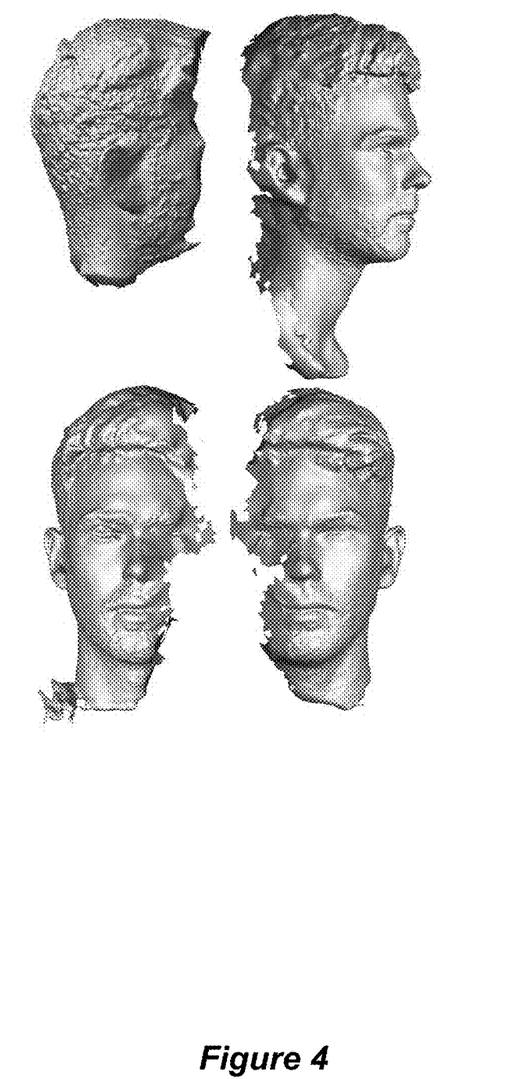
FIG. 4 illustrates the computed partial reconstructions.

A multi-view stereo reconstruction process is used to compute partial reconstructions from each of the one or more orientations. A partial reconstruction is a reconstruction based upon a particular orientation. FIG. 4 illustrates the computed partial reconstructions. Different portions of the mesh surface 105 are partially reconstructed based upon different orientations of image capture. Data from the one or more partial reconstructions is then aggregated to form the mesh surface 105.

Figure 5:
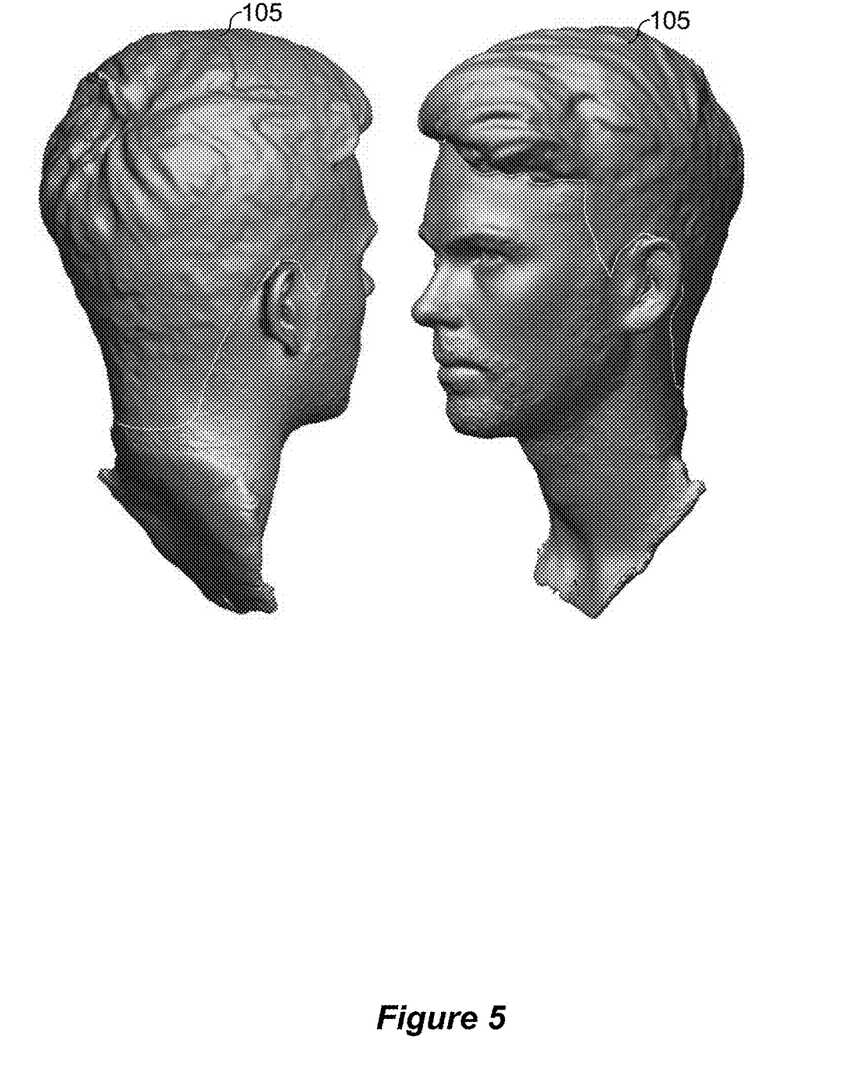
FIG. 5 illustrates an example of the mesh surface that is generated from the computed partial reconstructions illustrated in FIG. 4.

FIG. 5 illustrates an example of the mesh surface 105 that is generated from the computed partial reconstructions illustrated in FIG. 4. Profile views of the mesh surface 105 are illustrated. The mesh surface 105 comprises the geometric mesh for both the hair and face of the captured person, object, animal, etc. The mesh surface 105 is a base for synthesizing stylized details for both shape and color of the captured hair.

In one implementation, the hair is manually identified through masking by having an artist select what portions of the mesh surface are hair. Alternatively the artist may do the selection on a few images from which the mesh surface is masked via back projection. Colors are then assigned to the vertices of the mesh surface 105. In contrast with colors for a face, coloring the hair is not as geometrically accurate. For example, hair has a complex appearance with strong view dependent effects, e.g., specular reflection, translucency, and occlusions.

To solve for the complications associated with colorizing hair, color information is separated into two frequency bands, i.e., a low frequency band and a high frequency band, by using a Difference of Gaussians filter. The mesh surface 105 is colorized by averaging low frequency data from multiple views and sampling high frequency data from the most optimal view. An example of a criterion for the most optimal view is the highest foreshortening angle.

When averaging the low frequency color from multiple views, the resulting intensity may be different from the low frequency intensity in the most optimal view used to extract the high frequency component as a result of view dependent effects. In one implementation, the contrast is amplified to adjust the intensity of the high frequency components.

Color information is computed and stored directly on the mesh surface 105. Operations such as directional smoothing and shock filtering are then performed on a per vertex basis by using the geodesic distance, i.e., the distance on the surface, on the mesh surface 105. Structure tensors are computed from the input views, projected onto the mesh surface 105 and combined and stored directly on the mesh surface 105.

Figure 6:
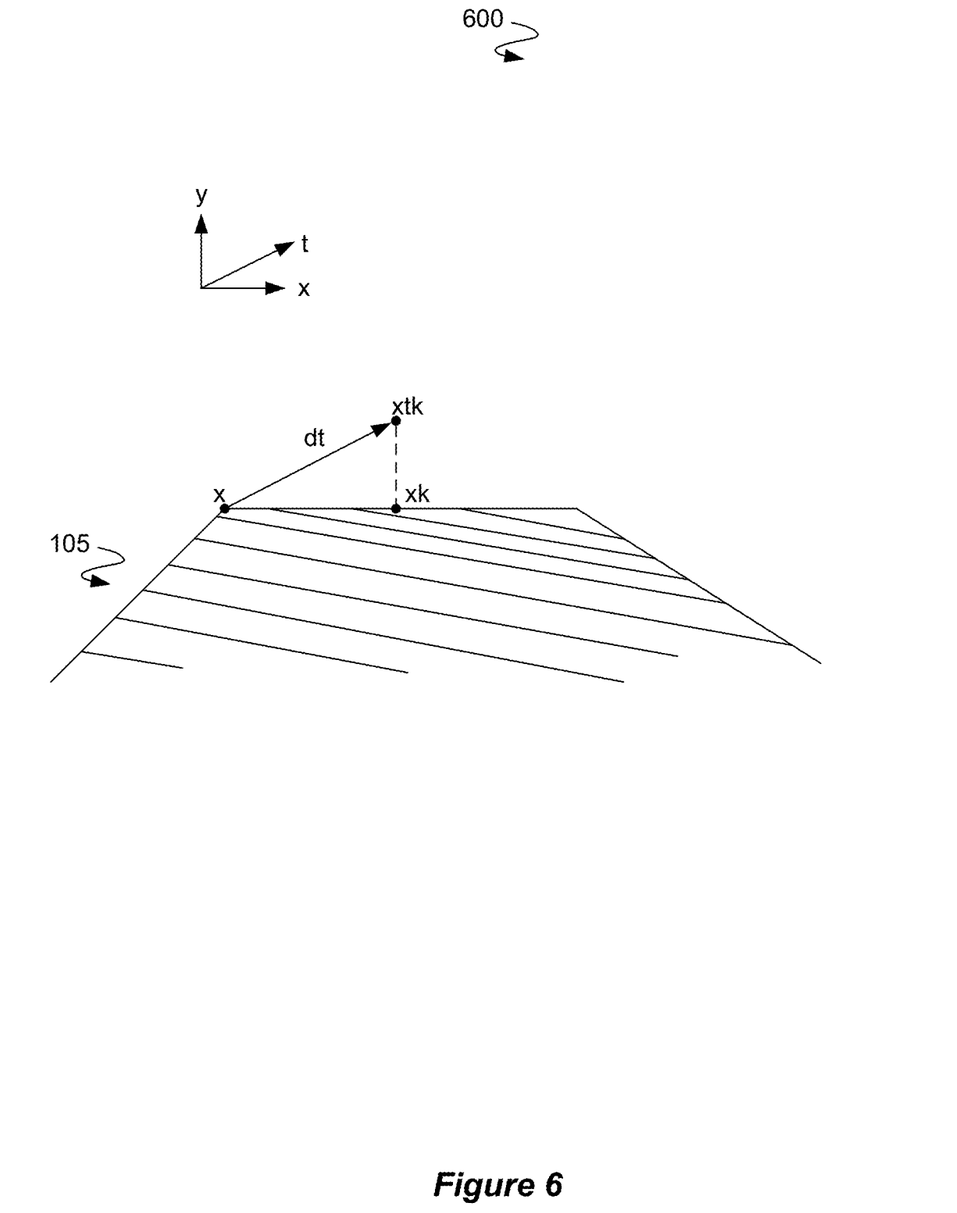
FIG. 6 illustrates a mapping configuration that performs the calculations for computing and retrieving the color information from the mesh surface.

FIG. 6 illustrates a mapping configuration 600 that is used to perform the calculations for computing and storing the color information on the mesh surface 105. A section of the mesh surface 105 is illustrated. The color at a direction t at a geodesic distance d from a current vertex x on the mesh surface 105 is determined. The vector dt is a color vector at geodesic distance d in the direction t. Since the mesh surface may not be planar, the vector dt may be off of the surface of the mesh surface 105. Therefore, the point $xtk=x+dt$ is calculated and projected onto the mesh surface 105 as xk to sample interpolated vertex information.

Figure 7:
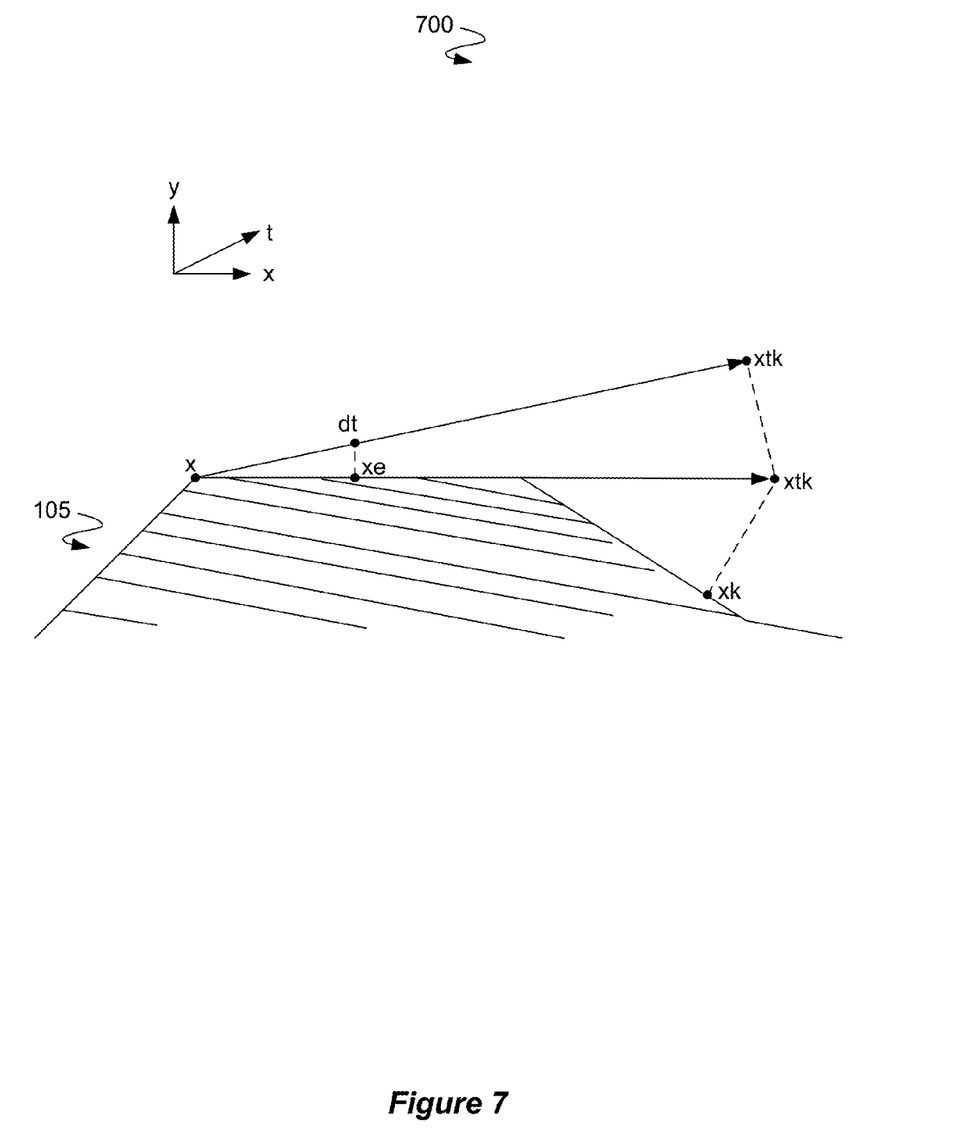
FIG. 7 illustrates a recursive mapping configuration that is performs the calculations for computing and retrieving the color information from the mesh surface in such an instance.

If d is greater than the local tessellation of the mesh surface 105, then xk will reside outside of the direct neighborhood of x. FIG. 7 illustrates a recursive mapping configuration 700 that performs the calculations for computing and storing the color information on the mesh surface 105 in such an instance. The closest vertex xe on the edge is used as a new starting vertex. The original vector dt is rolled down to the mesh surface 105 by subtracting xe−x from dt. After xk is computed, xk is interpolated utilizing barycentric coordinates, i.e., coordinates that define the locations of a vertices based upon the centers of masses of the vertices. In one implementation, the geodesic distance d is a function of the local vertex density to avoid sampling issues. In another implementation, d is selected as a function of local edge length or triangle area. The geodesic distance d could also be selected globally by an artist or as a function of the global vertex density, edge length, etc.

Figure 8:
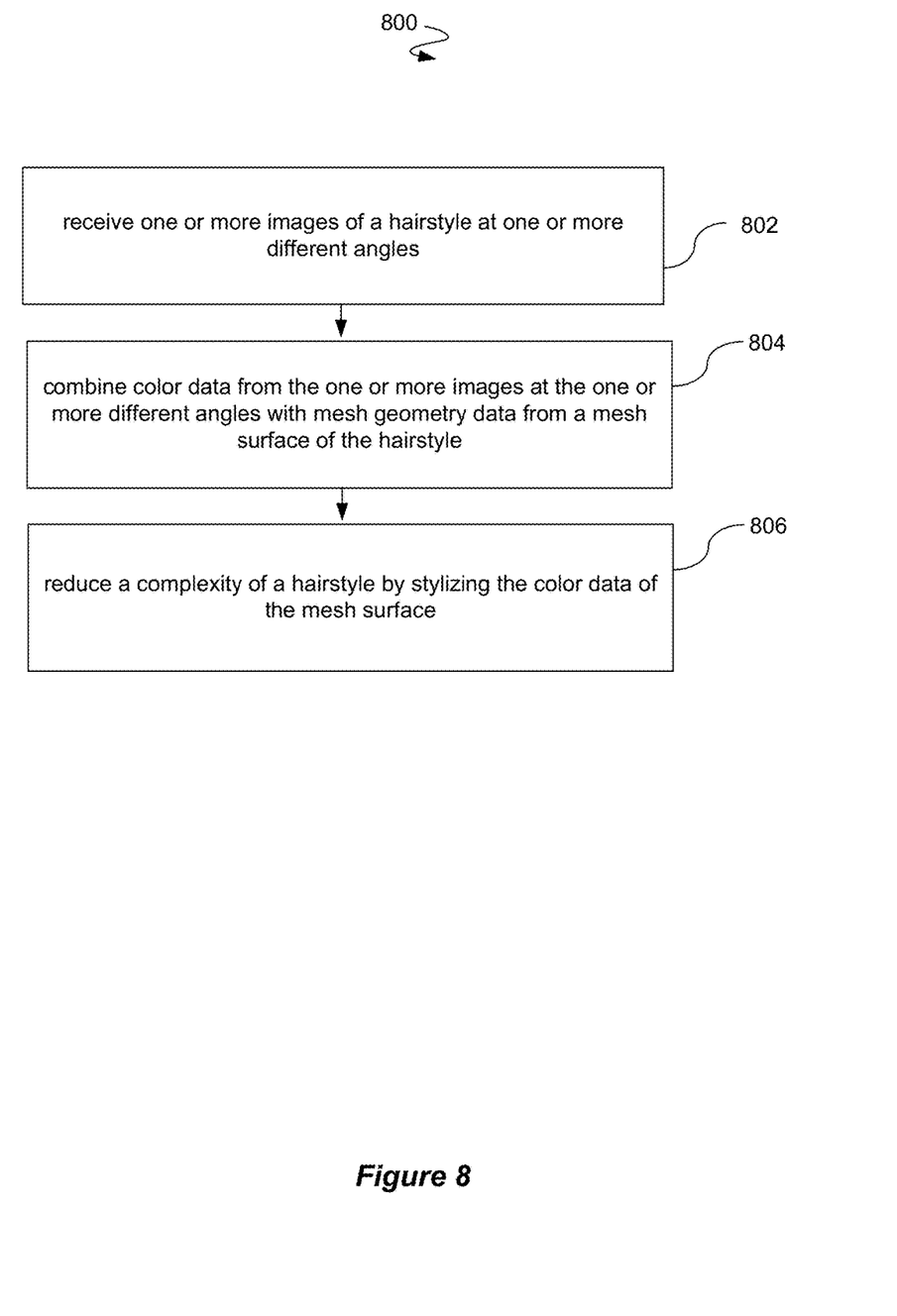
FIG. 8 illustrates a process that is provides color stylization for a hair style.

FIG. 8 illustrates a process 800 that is used to provide color stylization for a hair style as illustrated in FIGS. 1-3. At 802, the process 800 receives a plurality of images of a hairstyle at one or more different angles. The quantity of different angles depends on the quantity of viewpoints provided by each angle. Further, at 804, the process 800 combines color data from the plurality of images at the plurality of different angles with mesh geometry data from a mesh surface of the hairstyle. In one implementation, the mesh surface is generated by the hairstyle capture system. In another implementation, the mesh surface is received from another system. In addition, at 806, the process 800 reduces a complexity of the hairstyle to stylize the color data of the mesh surface.

Figure 9:
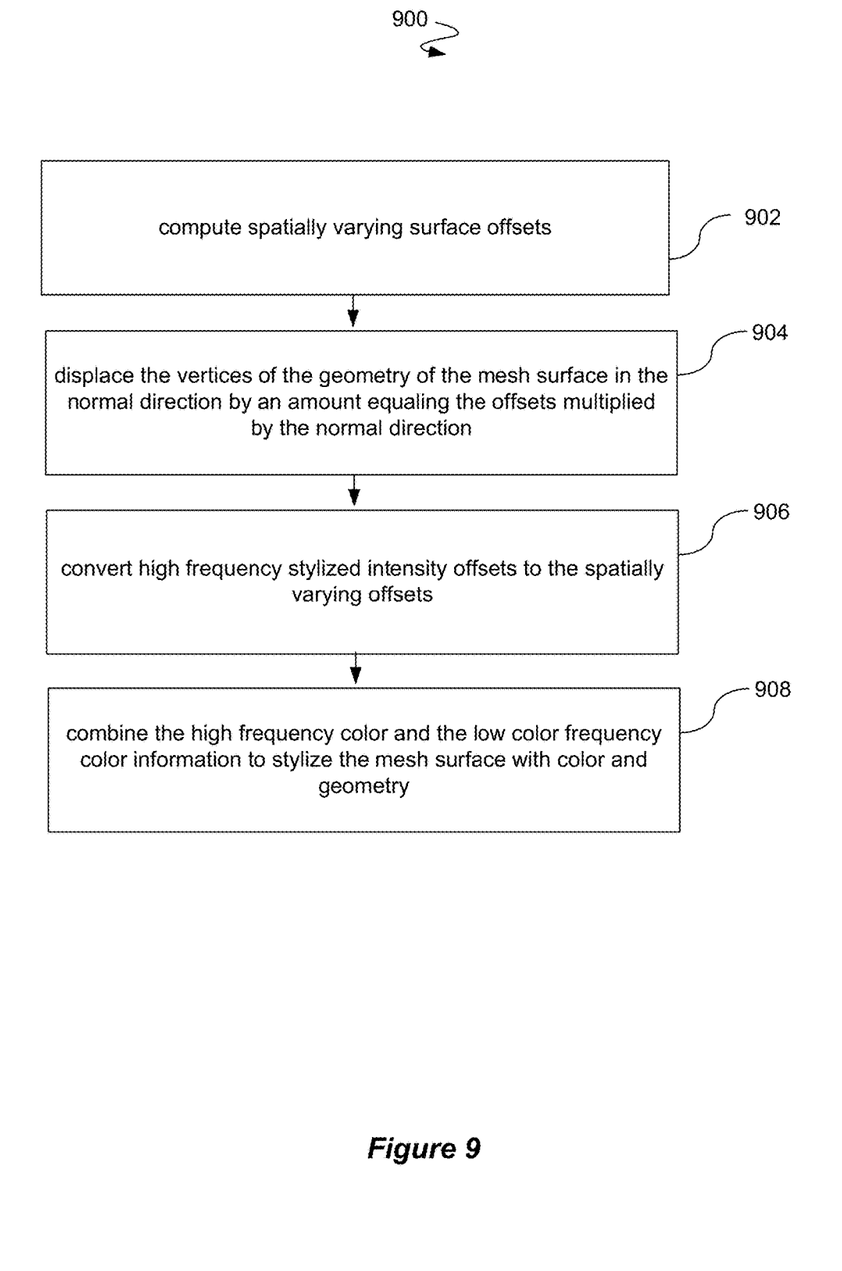
FIG. 9 illustrates a process that performs geometry stylization.

FIG. 9 illustrates a process 900 that is used to perform geometry stylization. Subsequent to color stylization, the color stylized high frequency information is represented in a color space over the mesh surface 105, e.g., the HSV color space. The process 900 stylizes the geometric details of the hair such that the geometric details are consistent with the color style. At 902, the process 900 computes spatially varying surface offsets. Further, at 904, the process 900 displaces the vertices of the geometry of the mesh surface in the normal direction by an amount equaling the offsets multiplied by the normal direction. In addition, at 906, the process 900 converts high frequency stylized intensity offsets to the spatially varying offsets. The high frequency stylized intensity offsets are used to determine the structural offsets as high frequency contrast is mostly attributed to shading changes resulting from hair geometry. In one implementation, the high frequency stylized intensity offsets are defined in the range of −1 to 1. A tone mapping application with an artistic parameter that controls the strength of the shape stylization is used to convert the high frequency stylized intensity offsets, e.g., the artistic parameter is multiplied by the high frequency stylized intensity offsets. At 908, the process 900 combines the high frequency color and the low frequency color information with the stylized geometry, creating the final stylized result.

In another implementation, a wisp profile may be generated. The shock operation in color stylization has the property of generating uniform intensities for all of the vertices within a shock in the direction of a gradient that produces wisps with a locally flat appearance in the hairstyle. A user defined wisp profile is generated to store the relative position of each vertex within a cross section of a wisp. Each relative position is then used to modulate the displacement. As a result, the user artistically controls the style of the hair.

The processes described herein may be implemented in a general, multi-purpose or special purpose processor. Such a processor will execute instructions, either at the assembly, compiled or machine-level, to perform the processes. Those instructions can be written by one of ordinary skill in the art following the description herein and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
receiving a plurality of images of a hairstyle at a plurality of different angles;
combining color data from the plurality of images at the plurality of different angles with mesh geometry data from a mesh surface of the hairstyle;
reducing a complexity of the hairstyle by stylizing the color data of the mesh surface to retain one or more directional wisps of the hairstyle;
computing spatially varying surface offsets;
displacing the vertices of the geometry of the mesh surface in a normal direction by an amount equaling the offsets multiplied by the normal direction;
converting high frequency stylized intensity offsets to the spatially varying offsets; and
combining the high frequency color and the low color frequency color information to stylize the mesh surface with color and geometry.

2. The method of claim 1, wherein the hairstyle is in an n dimensional space.

3. The method of claim 1, wherein each of the plurality of images is in an n−1 dimensional space.

4. The method of claim 1, wherein the mesh surface is an n−1 dimensional manifold in an n dimensional space.

5. The method of claim 1, further comprising generating the mesh surface.

6. The method of claim 1, further comprising receiving the mesh surface.

7. The method of claim 1, further comprising printing a 3D object with the hairstyle based on the color data that is stylized.

8. The method of claim 1, further comprising separating the color data into a low frequency band and a high frequency band.

9. The method of claim 1, further comprising translating a plurality of color offsets into a plurality of geometric displacements, and applying the plurality of geometric displacements to the mesh to determine a stylized mesh.

10. The method of claim 1, wherein the mesh surface is generated from a plurality of partial reconstructions of the hairstyle.

11. A computer program product comprising a computer readable storage device having a computer readable program stored thereon, wherein the computer readable program while executing on a computer causes the computer to:
receive a plurality of images of a hairstyle at a plurality of different angles;
combine color data from the plurality of images at the plurality of different angles with mesh geometry data from a mesh surface of the hairstyle;
reduce a complexity of the hairstyle by stylizing the color data of the mesh surface to retain one or more directional wisps of the hairstyle;
compute spatially varying offsets;
displace the vertices of the geometry of the mesh surface in a normal direction by an amount equaling the offsets multiplied by the normal direction;
convert high frequency stylized intensity offsets to the spatially varying offsets; and
combine the high frequency color and the low color frequency color information to stylize the mesh surface with color and geometry.

12. The computer program product of claim 11, wherein the hairstyle is in an n dimensional space.

13. The computer program product of claim 11, wherein each of the plurality of images is in an n−1 dimensional space.

14. The computer program product of claim 11, wherein the mesh surface is an n−1 dimensional manifold in an n dimensional space.

15. The computer program product of claim 11, wherein the computer is further caused to generate the mesh surface.

16. The computer program product of claim 11, wherein the computer is further caused to receive the mesh surface.

17. The computer program product of claim 11, wherein the computer is further caused to print a 3D object with the hairstyle based on the color data that is stylized.

18. The computer program product of claim 11, wherein the computer is further caused to separate the color data into a low frequency band and a high frequency band.

19. The computer program product of claim 18, wherein the computer is further caused to translate a plurality of color offsets into a plurality of geometric displacements, and applying the plurality of geometric displacements to the mesh to determine a stylized mesh.

20. The computer program product of claim 11, wherein the mesh surface is generated from a plurality of partial reconstructions of the hairstyle.

21. An apparatus comprising:
a processor that receives a plurality of images of a hairstyle at a plurality of different angles, combines color data from the plurality of images at the plurality of different angles with mesh geometry data from a mesh surface of the hairstyle, reduces a complexity of the hairstyle by stylizing the color data of the mesh surface to retain one or more directional wisps of the hairstyle, computes spatially varying offsets, displaces the vertices of the geometry of the mesh surface in a normal direction by an amount equaling the offsets multiplied by the normal direction, converts high frequency stylized intensity offsets to the spatially varying offsets, and combines the high frequency color and the low color frequency color information to stylize the mesh surface with color and geometry.

22. The apparatus of claim 21, further comprising an n dimensional printer that prints an object with the hair style based upon the mesh surface.

* * * * *